March 10, 1970  K. BECKER  3,499,356
CUTTING ARRANGEMENT
Filed July 20, 1967  3 Sheets-Sheet 1

INVENTOR:
Kurt BECKER
by Michael S. Shuker
Attorney

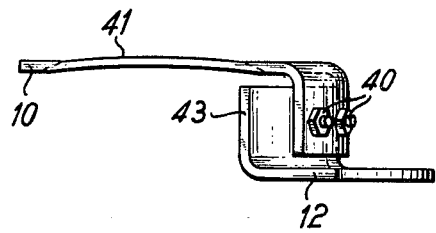
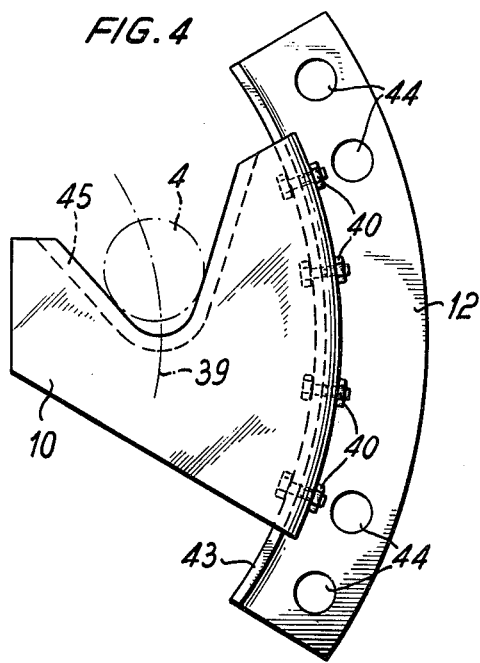

March 10, 1970     K. BECKER     3,499,356

CUTTING ARRANGEMENT

Filed July 20, 1967     3 Sheets-Sheet 3

INVENTOR:
Kurt BECKER

United States Patent Office 3,499,356
Patented Mar. 10, 1970

3,499,356
CUTTING ARRANGEMENT
Kurt Becker, Obernkirchen, Germany, assignor to Firma Hermann Heye, Obernkirchen, Germany
Filed July 20, 1967, Ser. No. 654,791
Claims priority, application Germany, July 27, 1966, H 60,077
Int. Cl. B26d 5/20
U.S. Cl. 83—355                    14 Claims

ABSTRACT OF THE DISCLOSURE

First and second cutters are rotated in opposite directions along a circular cutting path so that the cutters overlap in two cutting positions located at two cutting points of the circular cutting path. Workpieces such as highly viscous glass ropes are fed along feeding paths intersecting the cutting path at the cutting points so that the workpieces are cut by the cutters at the cutting points.

BACKGROUND OF THE INVENTION

The present invention relates to a cutting arrangement, and more particularly to apparatus for cutting one or several ropes consisting of a plastic material, such as highly viscous glass.

According to the prior art, oscillating cutters are used which move about a center spaced from the glass rope, or from a line connecting a plurality of glass ropes. These constructions require placing of the glass ropes on a straight line perpendicular to the direction of movement of the cutter.

It is also known to cut hollow glass bodies by scissor-like cutting means comprising a pair of oscillating cutting knives. If several glass ropes are simultaneously cut, difficulties arise in providing the feeding channels along which the glass bodies enter the machine.

SUMMARY OF THE INVENTION

It is one object of the invention to provide a cutting arrangement which is particularly suited for the cutting of ropes consisting of a plastic material, such as highly viscous glass, and which has a simple construction and is inexpensively manufactured, while operating reliably.

Another object of the invention is to provide a cutting arrangement capable of cutting several workpieces simultaneously in synchronism with the feeding of the workpieces.

Another object of the invention is to provide a continuously operating cutting arrangement which is driven by inexpensive and simple drive means.

With these objects in view, the present invention is concerned with a cutting arrangement which is particularly suited for the cutting of glass ropes.

One embodiment of the invention comprises first and second cutting means mounted for rotation about an axis along a circular cutting path so that the cutting means have an overlapping cutting position located at the cutting point of the circular cutting path, feeding means for feeding a workpiece, such as a highly viscous glass rope, along a feeding path intersecting the cutting path at the cutting point, and drive means for rotating the cutting means in opposite directions into and out of the cutting position whereby a workpiece fed along the feeding path is cut at the cutting point.

In the preferred embodiment of the invention, each of the first and second cutting means includes a plurality of cutters uniformly spaced about the circular cutting path so that the cutters overlap in a plurality of cutting positions located at the plurality of cutting points of the cutting path. Accordingly, the feeding means feed a plurality of workpieces along a plurality of feeding paths intersecting the cutting path at the cutting points.

If a pair of first cutters is diametrically disposed, and a pair of second cutters is diametrically disposed, the first and second cutters will overlap in cutting positions at two diametrically spaced cutting points of the circular cutting path, in which event two workpieces, such as glass ropes are fed to the two cutting points. In the event that three workpieces are to be cut, three first cutters are spaced 120°, and three second cutters are spaced 120° from each other so that the cutters overlap at three cutting points spaced 120°, and consequently the feeding means feed three workpieces which are spaced 120° from each other around the circular path of the cutters. The axis of rotation of the cutting means is also the center of the circular path of the same, and the center of the circle around which the feeding means for the workpieces have to be disposed.

It is an advantage of the invention that at the moment of cutting, the continuously driven cutters move at full speed, and are not retarded or stopped as in constructions of the prior art. Consequently, the heated glass ropes are in contact with the cutter only for a very short time, and are not cooled off by loss of heat to the cutters.

In the preferred embodiment of the invention, each cutting means includes at least one cutter, a holding means for the cutter, and an annular carrier for the holding means having a central opening. The central openings register and form a passage for the workpieces, and the cutters project inwardly from the annular carriers so that the circular cutting path is located within the openings of the carriers and within the circular path along which the carriers move.

It is preferred to use carriers having inner cylindrical portions and outer horizontal flange portions. The carrier having the higher flange portion has an inner cylindrical portion surrounding the inner cylindrical portion of the lower carrier. Bearing means are provided between the outer flange portions of the carriers and are rotatably supported on annular supporting means.

Preferably, each of the outer horizontal flanges of the carriers has a beveled annular face meshing with a beveled pinion on a horizontal drive shaft.

It is advantageous to feed a plurality of glass ropes intermittently and synchronize the rotary movement of the cutting means through the cutting position with the feeding of the workpieces. The cutters are adjustable so that the best cutting position of each two overlapping cutters can be selected.

The novel features which are considered as charactersitic are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWING

FIG. 3 is a side view illustrating on an enlarged scale the lower cutter of the embodiment of FIG. 1;

FIG. 4 is a plan view of the cutter shown in FIG. 3;

DESCRIPTION OF THE PREFERRED EMBODIMENT

Figure 1:
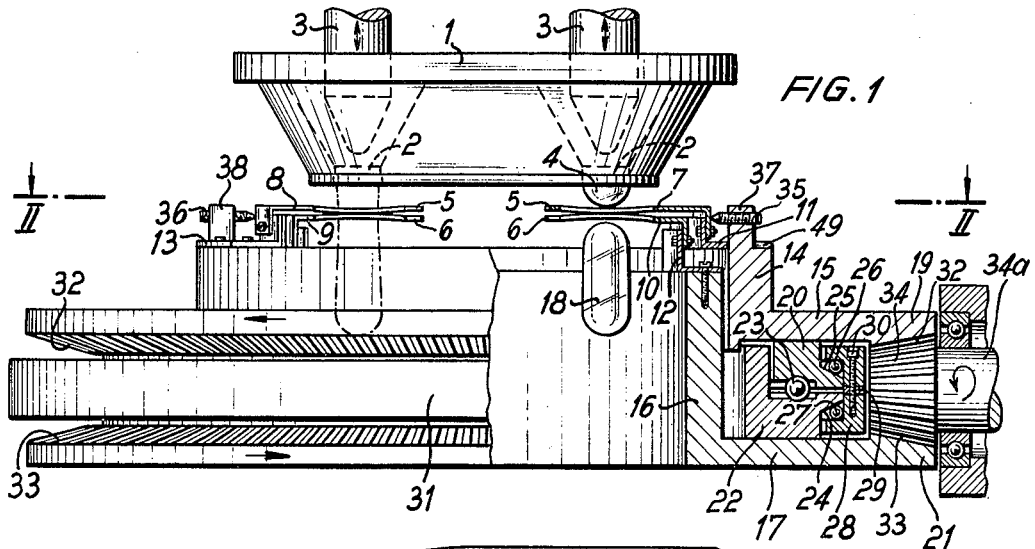
FIG. 1 is partially a side view, and partially an axial sectional view taken on line I—I in FIG. 2, and illustrating one embodiment of the invention.

The embodiment illustrated in FIGS. 1 to 6 is intended for cutting highly viscous heated glass ropes. A feeding ring 1 has two hopper cones with circular outlets 2. Plungers 3 reciprocate in vertical direction toward and away from the outlets 2 without touching the same. The highly viscous glass is pressed out of the respective outlets 2, and is retracted during the withdrawal of plungers 3 due to the inner friction in the glass mass, and friction in the outlets 2 and on the plunger surfaces. One or several ropes of highly viscous glass are discharged through the outlet openings 2 in the rythm of reciprocation of the plungers 3. A coherent glass rope is shown in the left portion of FIG. 1.

The cutting arrangement of the invention is disposed directly below the feeding means 1, 2, 3. A pair of first cutters 7 and 8 is located in an upper horizontal plane 5 and a pair of second cutters 9 and 10 is located in an adjacent lower horizontal plane 6. It would be possible, however, to provide only one upper cutter, for example 7, and one lower cutter for example 10. The four cutters are detachably mounted on four holding means of which holding means 11, 12 and 13 are clearly shown in FIG. 1 so that the cutters can be exchanged and replaced. The construction of the holding means will be described in greater detail with reference to FIGS. 3 to 6.

The holding means 11 and 13 of the upper cutters 7 and 8 are mounted in diametrical positions on the inner cylindrical portion 14 of an annular carrier 15 which has a horizontal outer flange 19. The holding means of the lower cutters 9 and 10 are mounted on the top edge of the cylindrical inner portion 16 of a lower annular carrier 17 which has an outer horizontal flange portion 21. Cylindrical portion 14 surrounds cylindrical portion 16 and projects above the same, and annular flange 19 is located above annular flange 21. The central openings of the annular carriers 15 and 17 register to permit passage of the workpieces. Cutters 7 to 10 project inwardly into the regions of the feeding paths of the workpieces. A cut-off glass drop 18 will fall through the central opening in the lower annular carrier 17. An annular supporting means 28 has an upper and a lower half which are secured to each other by screw bolts 30. The cross-section of the annular supporting means 28 is U-shaped, and each half includes half of the yoke of supporting means 28, and a leg portion constituting a supporting member.

Spacer rings 20 and 22 are respectively secured to flanges 19 and 21 and have slanted annular surfaces 24 and 25 projecting into the inner annular channel of the U-shaped annular supporting means 28 which is at least partly carried by supporting frame 31 which is interrupted in the region shown in the right side of FIG. 1.

Balls 26 and 27 are located between the beveled annular faces 24 and 25, and the confronting inner faces of annular supporting means 28 so that the spacer rings 20 and 22, and thereby the carriers 15 and 16 are supported for rotation. An axial ball bearing 23 is provided between spacer rings 20 and 22 to permit friction free relative rotation.

The outer flanges 19 and 21 of carriers 15 and 16, have annular beveled faces 32, 33 provided with bevel gear teeth meshing with a frustoconical bevel pinion 34 which is secured to a drive shaft 34a. When drive shaft 34a is driven in the direction of the arrow shown in FIG. 1, carriers 15 and 16 rotate in opposite directions as indicated by arrows in FIG. 2. Consequently, the first cutters 7 and 8, and the second cuters 9 and 10 rotate in opposite directions and assume the overlapping cutting positions shown in FIG. 2 twice during each revolution.

The suspension of the cutting arrangement on the supporting means 31, 38, and the roller bearings between the rotating carriers assure a precise spacing of the adjacent horizontal working planes 5 and 6 of the upper and lower cutters without wobbling which would impair the cutting operation. If the axial distance between the working planes 5 and 6 is to be changed, the position of the holding means 11 and 12 on carrier portions 14 and 16 may be adjusted. It is preferred to provide the cylindrical portion 14 of the upper carrier 15 with two projections 37 and 38 fitting into cutouts 49, see FIG. 6, of the horizontal portions of the holding means 11 and 13, and to adjust the position of the respective cutter 7 or 8 by screws 35, 36.

FIGS. 3 and 4 illustrate the construction and mounting of the lower cutter 10 which is slightly curved as indicated at 41 in FIG. 3, and has a V-shaped recessed cutting edge 45 leading in the direction of rotation. Cutter 10 has a downwardly projecting flange portion abutting the outside of a corresponding upwardly turned flange portion 43 of the holding means 12, and being secured to the same by several screws 40. The horizontal portion of holding means 12 rests on the top surface of the inner portion 16 of annular carrier 17, as best seen in FIG. 1, and is secured to the same by screws passing through four bores 44, as shown in FIG. 4. A glass rope 4 is shown in FIG. 4 in the moment in which it is engaged at two points by the recessed cutting edge 45.

Figure 5:
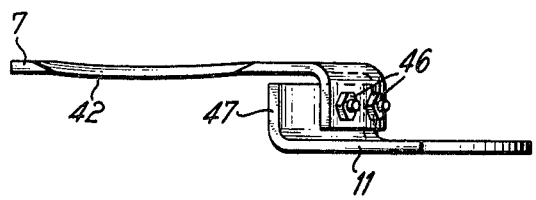
FIG. 5 is a side view illustrating on an enlarged scale the upper cuter of the embodiment of FIG. 1.
Figure 6:
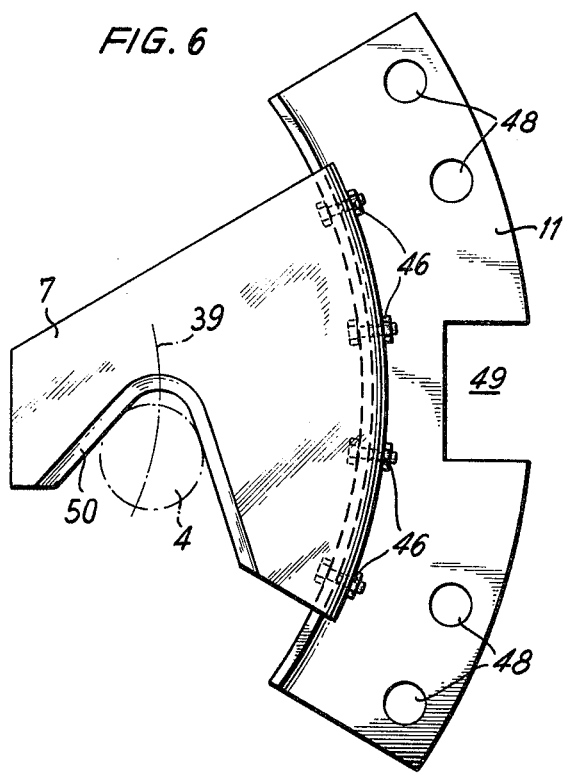
FIG. 6 is a plan view of the cutter shown in FIG. 5.

As shown in FIGS. 5 and 6, the upper cutter 7 is downwardly convex at 42 to cooperate with the upwardly convex portion 41 of cutter 10. Cutter 7 has a downward flange abutting the outer surface of an upward flange 47 of holding means 11 whose horizontal portion rests on the top face of cylindrical portion 14 of annular carrier 15 which has the above described upwardly projecting portion 37 located in cutout 49 of the horizontal portion of holding means 11. Four bores 48 are provided for screws attaching holding means 11 to carrier 15, and screws 46 detachably secure cutter 7 to holding means 11.

Figure 2:
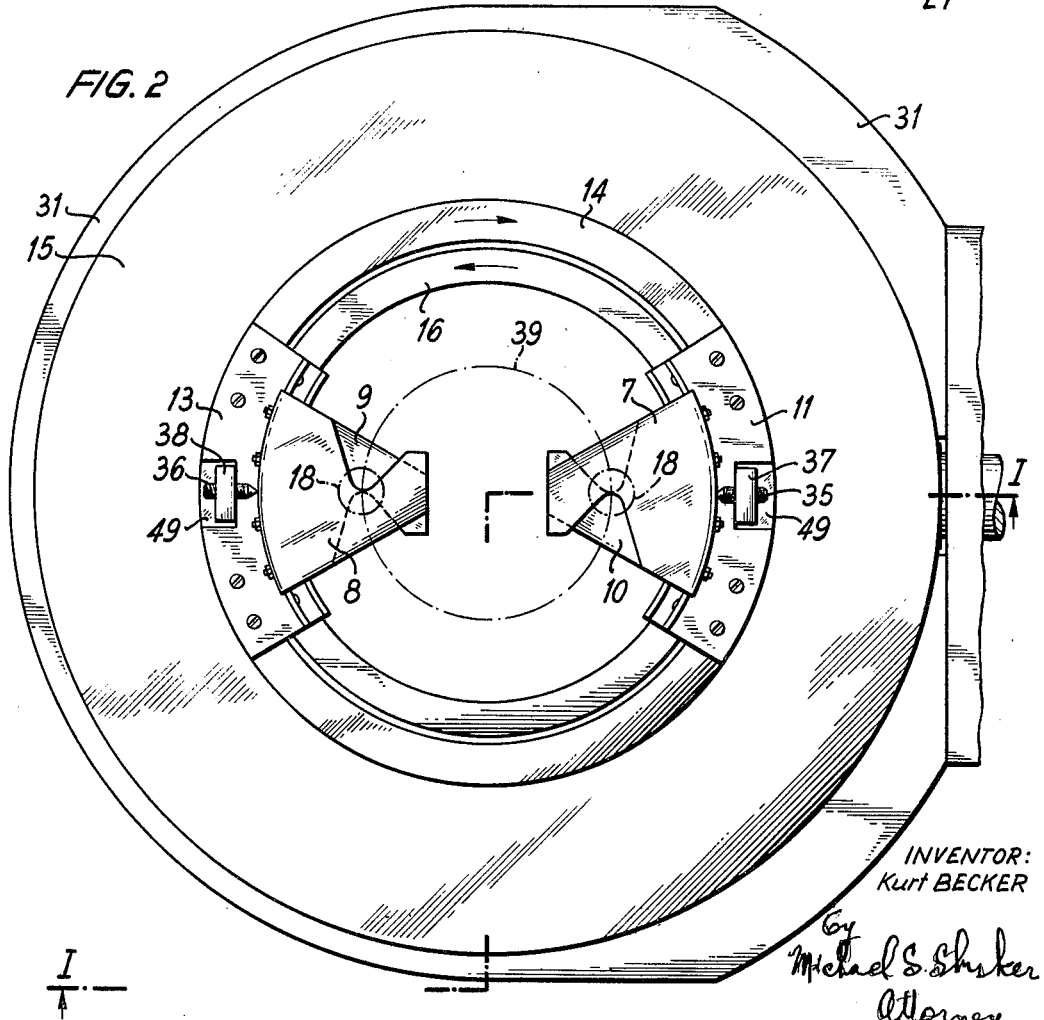
FIG. 2 is a plan view taken on line II—II in FIG .1.

Cutter 7 has a V-shaped recessed cutting edge 50 at its leading edge. As best seen in FIG. 2, the apeces of the V-shaped cutting edges are equidistant from the axis of rotation, so that they rotate along a common circular cutting path 39, and the outlets 2 of the feeding means 1, 2, 3 are disposed directly above the cutting points to feed glass ropes 4 through the central opening in carrier 17. When the upper and lower cutters are spaced, the glass rope can pass through the working planes 5 and 6, but when the cutters overlap in the illustrated cutting positions, the glass rope is cut-off and forms a drop 18 falling downwards through the central openings of the carriers.

When an upper cutter approaches a lower cutter, the glass rope 4 is first engaged at four points, and then cut along four chords.

The coaxial arrangement of the annular carriers 15 and 17 of the cutters and the horizontal drive arrangement results in a very compact construction which can be enveloped in a housing, not shown.

It will be understood that each of the elements described above, or two or more together may also find a useful application in other types of cutting arrangements, differing from the types described above.

While the invention has been illustrated and described as embodied in first and second cutters rotating in opposite directions and overlapping in the region of a fed glass rope to cut the same, it is not intended to be limited to the details shown, since various modifications and structural changes may be made without departing in any way from the spirit of the present invention.

What is claimed as new and desired to be protected by Letters Patent is set forth in the appended claims:

1. Cutting arrangement comprising, in combination, supporting means; first and second cutting means respectively including first and second carriers mounted on said supporting means for movement about an axis along a carrier path, and first and second cutters supported by said first and second carriers, respectively, radially inward of the same and of said supporting means, and for movement about said axis along a cutting path having a smaller diameter than said carrier path, said first and second cutters having an overlapping cutting position located at a cutting point of said cutting path; feeding means for feeding a workpiece in a direction parallel to said axis along a feeding path intersecting said cutting path at said cutting point; and drive means for rotating said first and second carriers in opposite directions along said carrier path so that said first and second cutters move in opposite directions along said cutting path and through said cutting position for cutting the workpiece within said carrier path at said cutting point.

2. Cutting arrangement as claimed in claim 1 wherein said first and second cutters have two overlapping cutting positions located at diametrically spaced cutting points of said cutting path; and wherein said feeding means feed two workpieces along two feeding paths intersecting said cutting path at said two cutting points.

3. Cutting arrangement as claimed in claim 1 wherein said first and second carriers are annular carriers mounted on said supporting means and having central openings whose diameters are greater than the diameter of said cutting path so that a workpiece moving along said feeding path is cut at said cutting point and moves through said central openings; and wherein said first and second cutting means include first and second holding means mounted on said first and second annular carriers for holding said first and second cutters radially inward of said first and second annular carriers and rotatable in first and second adjacent planes which are transverse to said axis.

4. Cutting arrangement as claimed in claim 3 wherein said holding means are detachably mounted on said carriers, respectively, and wherein said cutters are detachably mounted on said holding means, respectively.

5. Cutting arrangement as claimed in claim 3 wherein said annular carriers have inner annular cylindrical portions one of which surrounds the other, said holding means being respectively mounted on the top edges of said annular cylindrical portions, said carriers having outer annular portions located in planes parallel to said adjacent planes, and being driven by said drive means.

6. Cutting arrangement as claimed in claim 3 wherein said annular carriers have outer flange portions spaced from each other in axial direction of said annular carriers; and comprising bearing means between said annular flange portions.

7. Cutting arrangement as claimed in claim 6 comprising spacer rings secured to said annular flange portions and located on opposite sides of said bearing means, and wherein said spacer rings have a common axis coinciding with the axis of rotation of said carriers; and wherein said supporting means include annular support members located on opposite sides of said spacer rings for rotatably supporting the same and thereby said carriers.

8. Cutting arrangement as claimed in claim 7 and including bearing means between annular support members and said spacer rings, and wherein said supporting means has a substantially U-shaped cross section and is annular.

9. Cutting arrangement as claimed in claim 8 wherein said annular supporting means has two annular halves forming said annular support members, comprising adjusting means for adjustably securing said two annular halves to each other, wherein said bearing means between said support members and said spacer rings comprise balls, and wherein said spacer rings have slanted annular faces supporting said balls to permit adjustment of said annular halves.

10. Cutting arrangement as claimed in claim 3 wherein said annular carriers have outer flange portions spaced from each other in axial direction of said carriers, said flange portions having gear teeth; and wherein said drive means include a pinion meshing with said gear teeth, and a drive shaft carrying said pinion.

11. Cutting arrangement as claimed in claim 10 wherein each of said flange portions has a bevelled annular face having said gear teeth; and wherein said pinion is a bevel pinion located between said bevelled faces meshing with said gear teeth so that said drive shaft extends in radial direction in relation to the axis of rotation of said carriers.

12. Cutting arrangement as claimed in claim 10 wherein said feeding means intermittently supply elongated workpieces consisting of a highly viscous material; wherein said drive means synchronize the speed of rotation of said cutters with the intermittent operation of said feeding means; and wherein said axis of rotation and said feeding path are vertical.

13. Cutting arrangement as claimed in claim 1 and comprising means for adjusting the position of said cutters in a direction perpendicular to the axis of rotation of said carriers.

14. Cutting arrangement as claimed in claim 1 wherein said first and second cutter means include first and second cutting knives located in said adjacent planes, said cutting knives having recessed cutting edges overlapping at said cutting point for engaging the workpiece.

References Cited

UNITED STATES PATENTS

| | | | |
|---|---|---|---|
| 729,963 | 6/1903 | Rogers et al. | 65—334 X |
| 1,992,537 | 2/1935 | McNair | 83—591 |
| 2,092,864 | 9/1937 | Wadsworth | 65—133 |
| 3,287,098 | 11/1966 | Stutske et al. | 65—133 |
| 2,993,302 | 7/1961 | Soubier | 65—303 X |

FOREIGN PATENTS 878,176   6/1953   Germany.

JAMES M. MEISTER, Primary Examiner

U.S. Cl. X.R.

83—591